US010533695B2

(12) United States Patent
 Walter et al.

(10) Patent No.: US 10,533,695 B2
(45) Date of Patent: Jan. 14, 2020

(54) GUIDE FOR A PIPELINE PIG

(71) Applicants: Bronislav Walter, Edmonton (CA);
 Scott Walter, Edmonton (CA)

(72) Inventors: Bronislav Walter, Edmonton (CA);
 Scott Walter, Edmonton (CA)

(*) Notice: Subject to any disclaimer, the term of this patent is extended or adjusted under 35 U.S.C. 154(b) by 252 days.

(21) Appl. No.: 15/453,068

(22) Filed: Mar. 8, 2017

(65) Prior Publication Data
 US 2017/0261147 A1 Sep. 14, 2017

(30) Foreign Application Priority Data
 Mar. 8, 2016 (CA) ........................... 2923031

(51) Int. Cl.
 *F16L 55/44* (2006.01)
 *B08B 9/055* (2006.01)
(52) U.S. Cl.
 CPC .............. *F16L 55/44* (2013.01); *B08B 9/055* (2013.01); *B08B 9/0551* (2013.01); *B08B 9/0557* (2013.01)
(58) Field of Classification Search
 CPC ....... B08B 9/053; B08B 9/0551; B08B 9/055; B08B 9/0553; B08B 9/0557; F28G 1/12;
 (Continued)

(56) References Cited

U.S. PATENT DOCUMENTS 2,328,060 A 8/1943 Crane et al.
2,575,624 A * 11/1951 Hall .................... B08B 9/0553
 15/104.061

(Continued)

FOREIGN PATENT DOCUMENTS

KR 10-2013-0113754 A 10/2013
KR 101348637 1/2014
WO 2007/020438 A2 2/2007

OTHER PUBLICATIONS

GEOG Aug. 2005 Newsletter—North American Edition, "Pioneering in-line data collection for unpiggable pipelines", GE Energy Oil & Gas Pipeline Solutions, http://site.ge-energy.com/prod_serv/serv/pipeline/en/newsletter/july/na/g, Aug. 2005, 3 pages.

(Continued)

*Primary Examiner* — Mark Spisich
(74) *Attorney, Agent, or Firm* — Seed Intellectual Property Law Group LLP

(57) ABSTRACT

There is provided an expandable pipeline pig for a varying diameter pipeline having a pig body that carries two or more guides and one or more actuators. Each guide has a resilient body with a folding zone between an outer perimeter and a central area connected to the pig body, a series of support members spaced circumferentially about the resilient body within the folding zone, and a series of collapsing structures positioned between, and integrally formed with, adjacent support members. The actuators selectively release the guides from a reduced to an expanded mode. In the expanded mode the support members extend outward and the collapsing structures are expanded between the support members. In the reduced mode the support members are folded toward the pig body and the collapsing structures are collapsed to reduce a circumference of the resilient body outer perimeter. The support members are biased toward the expanded mode.

23 Claims, 5 Drawing Sheets

(58) Field of Classification Search
CPC . F16L 55/26; F16L 55/28; F16L 55/38; F16L 55/40; F16L 55/44; F16L 2101/10; F16L 55/12
USPC .......................... 15/104.061, 104.17–104.19
See application file for complete search history.

(56) References Cited

U.S. PATENT DOCUMENTS

| | | | | |
|---|---|---|---|---|
| 2,958,884 | A * | 11/1960 | Hill | B08B 9/0553 15/104.061 |
| 3,107,379 | A * | 10/1963 | Hill | B08B 9/0553 15/104.061 |
| 3,619,844 | A * | 11/1971 | Collins et al. | B08B 9/0557 15/104.061 |
| 3,691,584 | A * | 9/1972 | Landers | B08B 9/0557 15/104.061 |
| 3,939,519 | A * | 2/1976 | Muirhead | B08B 9/0557 15/104.061 |
| 5,295,279 | A * | 3/1994 | Cooper | B08B 9/0557 15/104.061 |
| 5,457,841 | A | 10/1995 | Minton | |
| 6,339,993 | B1 | 1/2002 | Comello et al. | |
| 6,381,797 | B1 | 5/2002 | Filippovitch et al. | |
| 6,574,821 | B1 | 6/2003 | Dal Maso et al. | |
| 7,614,109 | B2 | 11/2009 | Filippovitch | |
| 8,011,052 | B2 | 9/2011 | Kapustin et al. | |
| 2001/0010104 | A1 | 8/2001 | Couchman et al. | |
| 2011/0203676 | A1 | 8/2011 | Been et al. | |

OTHER PUBLICATIONS

K Marshine SDN BHD, "Dual-Diameter & Multi-Diameter Pigs", http://kmarshine.com.my/sub_product1.php?id=21, retrieved Mar. 11, 2015, 1 page.

* cited by examiner

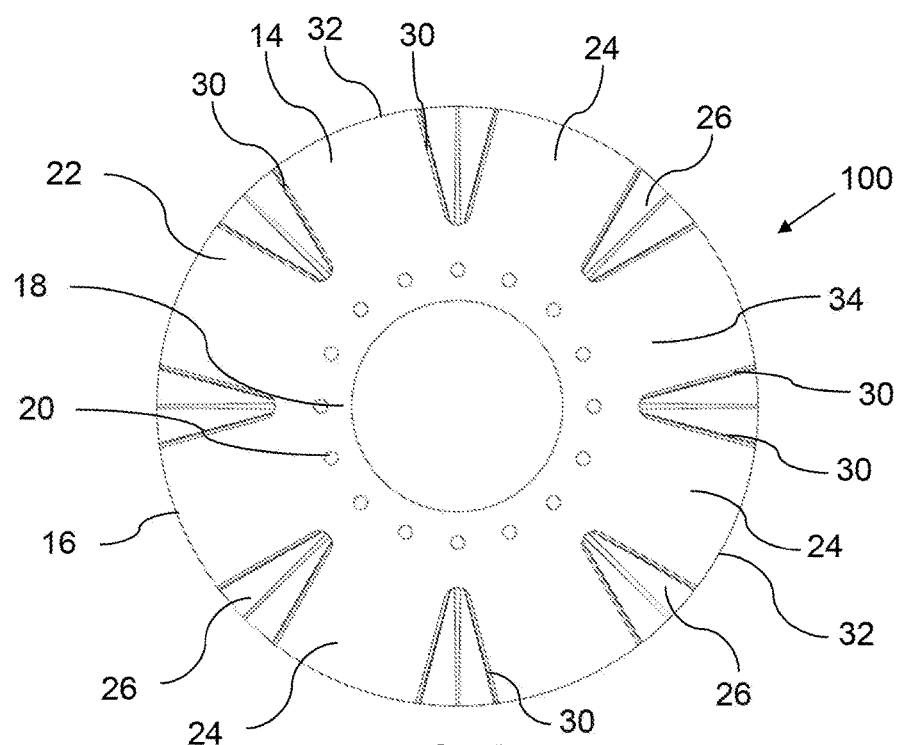
FIG. 1
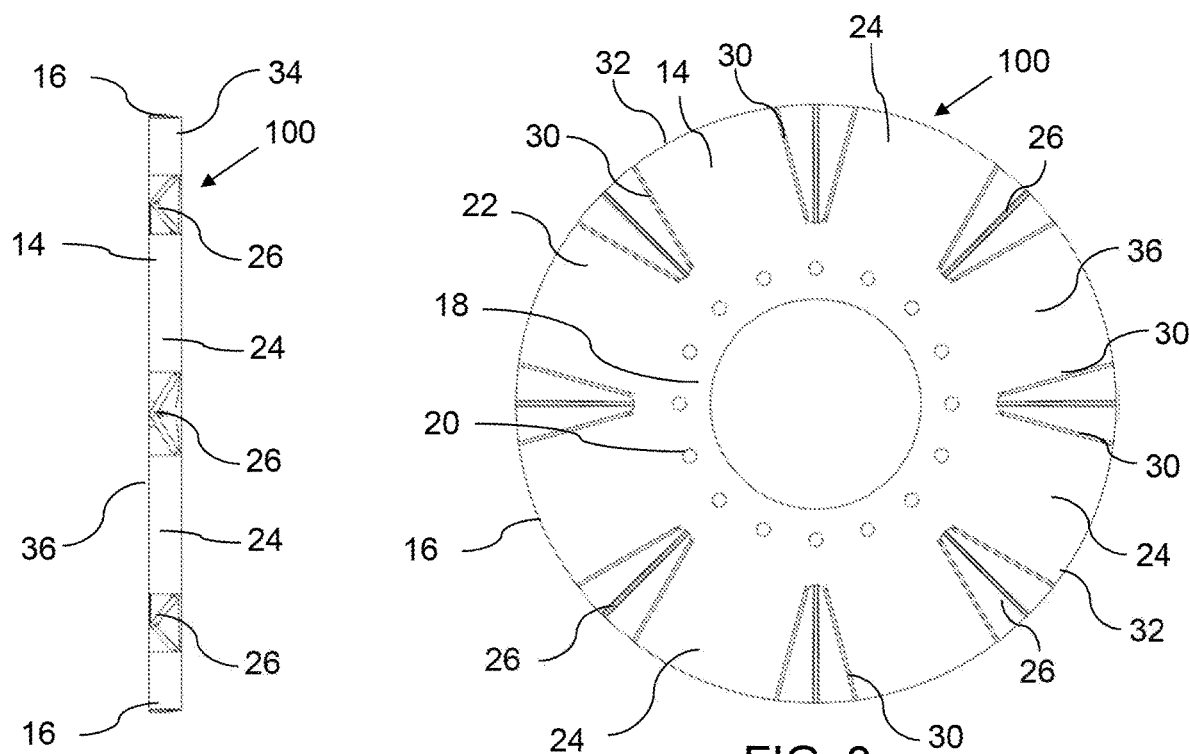
FIG. 2
FIG. 3

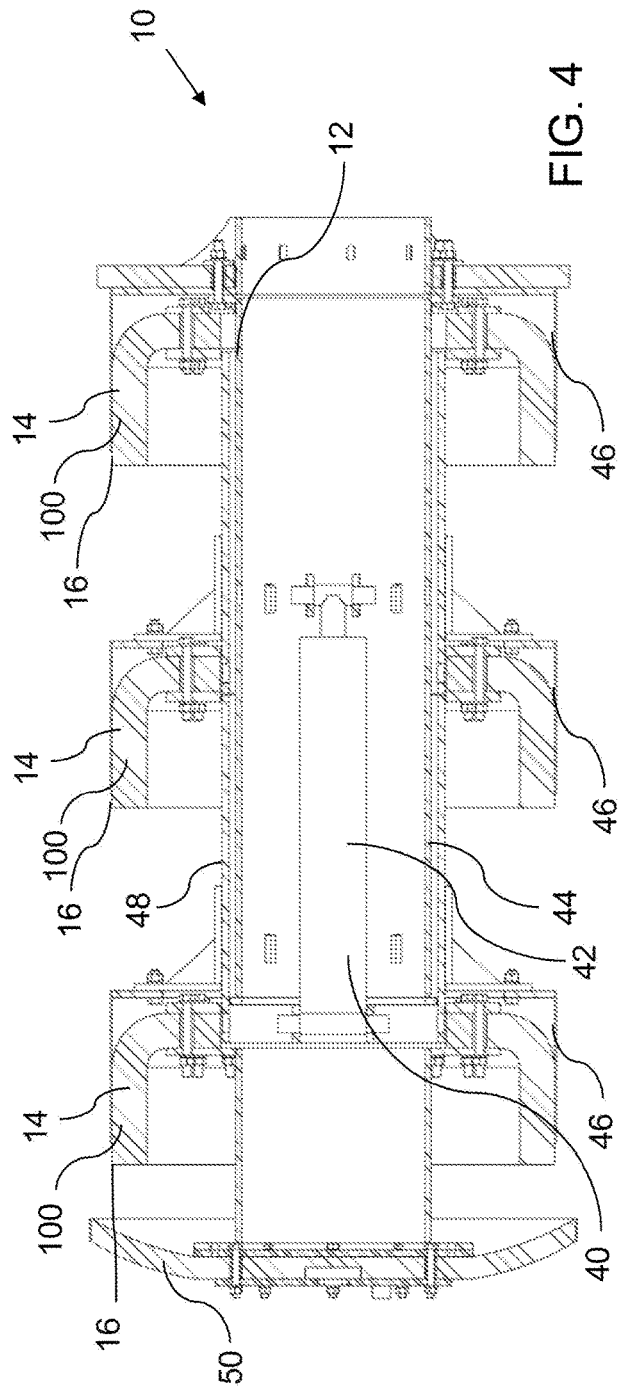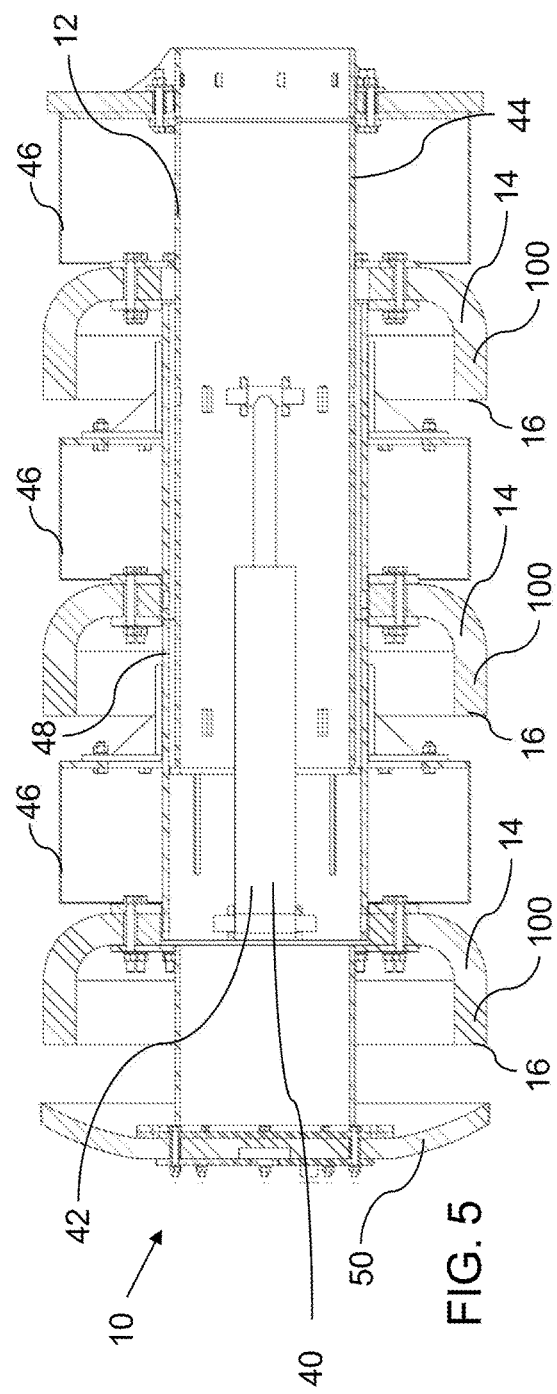

GUIDE FOR A PIPELINE PIG

TECHNICAL FIELD

This relates to a guide and a pipeline pig that are designed to be used in a pipeline with more than one diameter.

BACKGROUND

Pipeline pigs are used for many maintenance operations, such as inspections, and are often used while fluid is flowing through the pipeline. The pipeline pig generally has guides that extend out from a central body to keep the body centralized, and rubber rings or disks that engage the inner surface of the pipeline, which allows a pressure differential to move the pig through a pipeline. In some circumstances, it is necessary to insert the pig in a pipeline that has a larger diameter downstream of the injection point. In cases like this, it is necessary to allow the pig to expand in order to keep it centralized, and maintain the pressure differential. U.S. pre-grant publication no. 2001/0010104 (Couchman et al.) entitled "Pipeline Pigs" describes a pipeline pig with support elements that keep the pig centralized, and drive elements that engage the inner will of the pipelines. Both the support and the drive elements adapt to a range of pipeline diameters.

SUMMARY

According to an aspect, there is provided an expandable diameter pipeline pig for a varying diameter pipeline, the pipeline pig comprising a pig body, two or more guides carried by the pig body, each of the guides comprising a resilient body having an outer perimeter, a central area connected to the pig body, and a folding zone between the outer perimeter and the central area, a series of support members spaced circumferentially about the resilient body within the folding zone, and a series of collapsing structures positioned between, and integrally formed with, adjacent support members, and one or more actuators carried by the pig body that selectively release the guides from a reduced diameter mode to an expanded diameter mode, wherein, in the expanded diameter mode, the support members extend outward relative to the pig body and the collapsing structures are expanded between the support members, and in the reduced diameter mode, the support members are folded toward the pig body and the collapsing structures are collapsed to reduce a circumference of the outer perimeter of the resilient body, the support members being biased from the reduced diameter mode toward the expanded diameter mode.

According to another aspect, the collapsing structures may comprise membranes having a thickness that is less than a thickness of the support members.

According to another aspect, the membranes may slope away from a front face of the support members, the front face of the support members facing away from the pig body in the reduced diameter mode.

According to another aspect, the membranes may be integrally connected to the support members by living hinges.

According to another aspect, the membranes may have a width that extends between adjacent support members and a depth relative to the front face of the support members, and the width and the depth of the membranes may increase as the membranes move away from the central area toward the outer perimeter.

According to another aspect, the membranes may comprise planar surfaces that angle away from the front face of the support members and meet at a central joint. The angle of each planar surface may increase relative to the front face as each planar surface moves from the outer perimeter toward the central area.

According to another aspect, the resilient body may be a disc-shaped body having a front face and a rear face, the rear face folding toward the pig body in the reduced diameter mode, wherein the collapsing zones are integrally formed with the support members at the front face of the disc-shaped body and extend toward the rear face.

According to another aspect, the one or more actuators may comprise a length adjustable member and a retainer that selectively engages each guide, the length adjustable member moving the retainers along an axis of the pig body between a first position in which the retainers retain the guides in the reduced diameter mode and a second position in which the guides are released to the expanded diameter mode.

According to another aspect, in the expanded diameter mode, the guides may be sufficiently strong to independently centralize the pipeline pig in a pipeline.

According to an aspect, there is provided an expandable guide for a pig body, comprising a resilient body having an outer perimeter, a central area having a connection for connecting to the pig body, and a folding zone between the outer perimeter and the central area, a series of support members spaced circumferentially about the resilient body within the folding zone, a series of collapsing structures positioned between, and integrally formed with, adjacent support members, and the resilient body being movable between an expanded diameter mode and a reduced diameter mode, wherein, in the reduced diameter mode, wherein, in the expanded diameter mode, the support members extend outward relative to the pig body and the collapsing structures are expanded between the support members, and in the reduced diameter mode, the support members are folded toward the pig body and the collapsing structures are collapsed to reduce a circumference of the outer perimeter of the resilient body, the support members being biased from the reduced diameter mode toward the expanded diameter mode.

According to another aspect, the collapsing structures may comprise membranes having a thickness that is less than a thickness of the support members.

According to another aspect, the membranes may slope away from a front face of the support members, the front face of the support members facing outward in the reduced diameter mode.

According to another aspect, the membranes may be integrally connected to the support members by living hinges.

According to another aspect, the membranes may have a width that extends between adjacent support members and a depth relative to the front face of the support members, wherein the width and the depth of the membranes may increase as the membranes move away from the central area toward the outer perimeter.

According to another aspect, the membranes may comprise planar surfaces that angle away from the front face of the support members and meet at a central joint. The angle of each planar surface may increase relative to the front face as each planar surface moves from the outer perimeter toward the central area.

According to another aspect, the resilient body may be a disc-shaped body having a front face and a rear face, the rear face folding inward in the reduced diameter mode, wherein the collapsing zones are integrally formed with the support members at the front face of the disc-shaped body and extend toward the rear face.

According to an aspect, there is provided a method of inserting a pipeline pig into a pipeline, at an insertion point, the pipeline having a first diameter at the insertion point and a second diameter downstream from the first diameter, the second diameter being greater than the first diameter, the method comprising the steps of providing a pipeline pig having a first guide and a second guide attached to a pig body, each of the first guide and the second guide comprising a resilient body having an outer perimeter, a central area connected to the pig body, and a folding zone between the outer perimeter and the central area, and a series of support members spaced circumferentially about the resilient body within the folding zone, and a series of collapsing structures positioned between, and integrally formed with, adjacent support members, configuring the pipeline pig in a reduced diameter mode, wherein the support members are folded toward the pig body such that the collapsing structures collapse to reduce a circumference of the outer perimeter of the resilient body, with the pipeline pig in a reduced diameter mode, inserting the pipeline pig into the pipeline at the insertion point, releasing the support members from the reduced diameter mode such that the support members are biased toward the expanded diameter mode, and creating a pressure differential across the pipeline pig to cause the pipeline pig to travel toward the second diameter of the pipeline.

According to another aspect, the collapsing structures may comprise membranes having a thickness that is less than a thickness of the support members.

According to another aspect, the membranes may slope away from a front face of the support members, the front face of the support members facing away from the pig body in the reduced diameter mode.

According to another aspect, the membranes may be integrally connected to the support members by living hinges.

According to another aspect, the membranes may have a width that extends between adjacent support members and a depth relative to the front face of the support members, and the width and the depth of the membranes may increase as the membranes move away from the central area toward the outer perimeter.

According to another aspect, the membranes may comprise planar surfaces that angle away from the front face of the support members and meet at a central joint. The angle of each planar surface may increase relative to the front face as each planar surface moves from the outer perimeter toward the central area According to another aspect, the resilient body may be a disc-shaped body having a front face and a rear face, the rear face folding toward the pig body in the reduced diameter mode, wherein the collapsing zones are integrally formed with the support members at the front face of the disc-shaped body and extend toward the rear face.

According to another aspect, configuring the pipeline pig in a reduced diameter mode may comprise actuating a length adjustable member to move retainers that engage each guide and fold the support members toward the pig body.

According to another aspect, releasing the support members from the reduced diameter mode may comprise causing the length adjustable member to move the retainers along an axis of the pig body between a first position in which the retainers retain the guides in the reduced diameter mode and a second position in which the guides are released to the expanded diameter mode.

According to another aspect, in the expanded diameter mode, the guides may be sufficiently strong to independently centralize the pipeline pig in a pipeline.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1 is a front elevation view of a guide for use with a pipeline pig.

FIG. 2 is a side elevation view of a guide for use with a pipeline pig.

FIG. 3 is a rear elevation view of a guide for use with a pipeline pig.

FIG. 4 is a side elevation view in section of a pipeline pig in a smaller diameter mode.

FIG. 5 is a side elevation view in section of a pipeline pig after being released from the smaller diameter mode.

DETAILED DESCRIPTION

Figure 6:
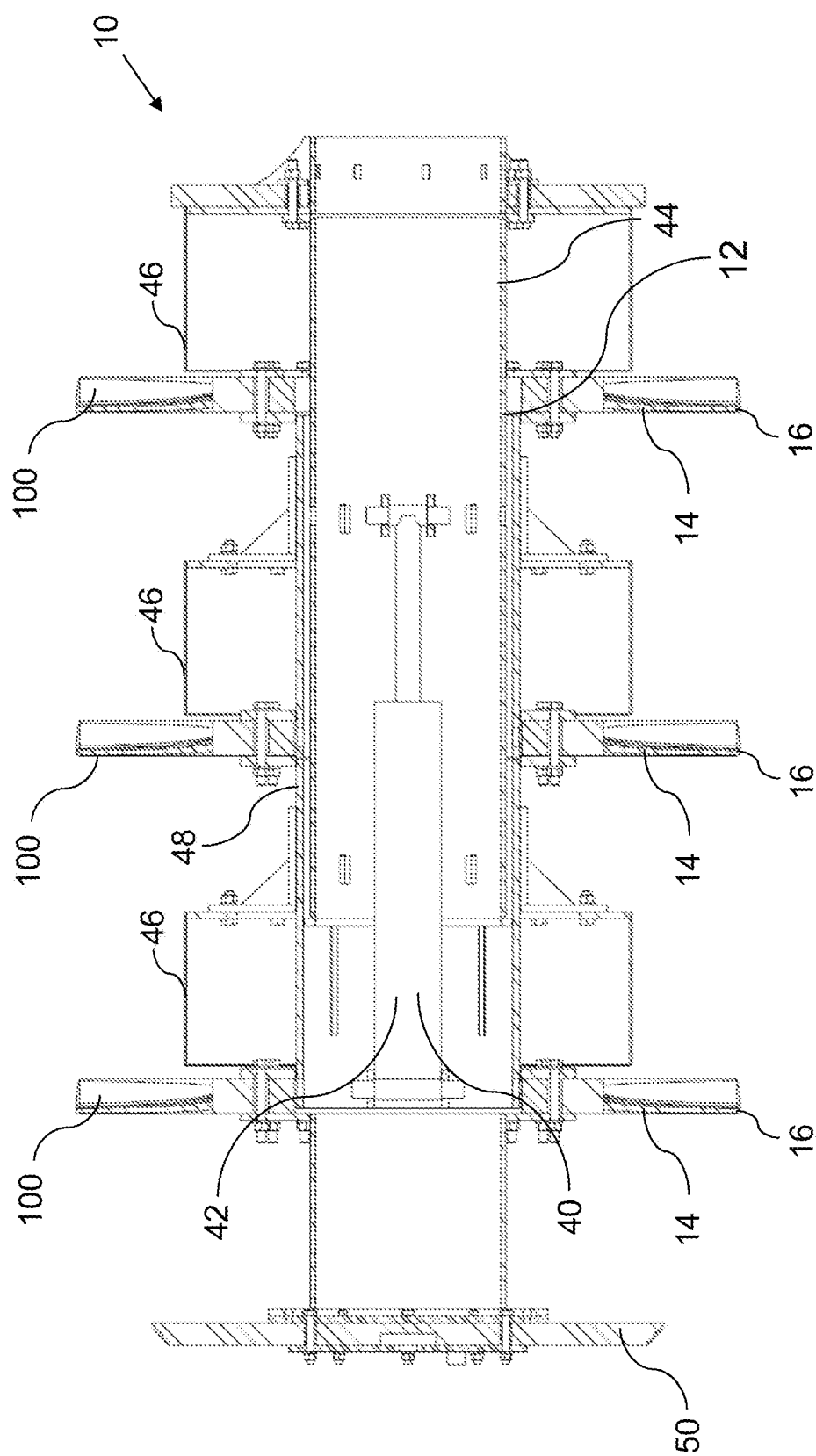
FIG. 6 is a side elevation view in section of a pipeline pig in a larger diameter mode.

An expandable diameter pipeline pig, generally identified by reference numeral 10, and a guide element, generally indicated by reference numeral 100, will now be described with reference to FIG. 1 through 8.

Expandable diameter pipeline pig 10 as described herein was developed with the intention of being used in pipelines that expand to a larger diameter downstream of where pig 10 is injected. As such, the description below will be given in terms of this situation. However, it will be understood that this is merely by way of example, and that there may be other circumstances in which pipeline pig 10 or guide element 100 could be beneficially used.

Referring to FIG. 4, pipeline pig 10 includes a pig body 12, with guides 100 carried by pig body 12. As shown, pig body 12 is a telescopic body having a movable sleeve 44 nested within an outer sleeve 48. As shown, pig 10 includes three guides 100, although the number may be more or less than this, depending on the preferences of the user. Preferably, there will be at least two guides 100 in order to properly support pipeline pig 10 in a pipeline.

Referring to FIG. 1, guide 100 has a resilient body 14 with an outer perimeter 16 that is sized to engage an inner surface of a pipeline, and a central area 18 with a connection 20 that is designed to connect to pig body 12. As guide 100 is intended to be used in a pipeline with varying diameters, the diameter of perimeter 16 is variable to match the pipeline. This is possible by providing a folding zone 22 between outer perimeter 16 and central area 18. Folding zone 22 has a series of support members 24 spaced circumferentially about resilient body 14 within folding zone 22, and a series of collapsing structures 26 positioned between, and integrally formed with, adjacent support members 24.

Preferred embodiments of guide 100 will now be given. However, it will be understood that support members 24 and collapsing structures 26 may take a variety of forms to accomplish a similar purpose. However, it has been found that the design principles discussed below allow for certain advantages, such as a more predictable folding within folding zone 22 that prevents buckling or overlapping of sections of resilient body 14, a more supportive structure that allows guide 100 to support pipeline pig 10, and an integrally formed surface that ensures a sufficient engagement with a pipeline to allow the necessary pressure differential to move pipeline pig 10.

As shown, support members 24 extend out from central area 18, and have generally parallel, or nearly parallel, side edges 30 with a rounded edge surface 32 to engage the pipeline. The relative angle between side edges 30 are selected such that, when collapsed, there is sufficient space to prevent buckling or overlapping. As such, the angle will depend on the degree to which support members 24 are intended to bend before engaging. For example, referring to FIG. 4, support members 24 in the depicted embodiment are designed to fold such that they are nearly parallel to pig body 12 to achieve a minimum outer diameter in a reduced diameter mode. In some circumstances, such a reduction may be unnecessary, and support members 24 may not be bent to such a degree. In that case, the relative angle between side edges 30 may be greater. In any event, support members 24, taking into account collapsing structures 26 as described below, are sized and shaped such that they create a relatively continuous outer perimeter in the reduced diameter mode.

Resilient body 14 is shown as being disc-shaped with a constant thickness, aside from collapsing structures 26 discussed below. Resilient body 14 has a front face 34 and a rear face 36, where rear face 36 folds toward pig body 12 in the reduced diameter mode, as shown in FIGS. 4 and 5. To maintain the integrity of resilient body 14 when collapsed and expanded, collapsing structures 26 are integrally formed with support members 24.

As will be understood by those skilled in the art, the material and the thickness of the material, will be selected to be flexible enough to be elastically folded into a contracted state, while being sufficiently resilient to return to an expanded state when released, and with sufficient strength to support and centralize pipeline pig 10 within a pipeline. Furthermore, support members 24 are preferably sufficiently strong to support pipeline pig 10 independently of other structures or supports, such that resilient body 14 acts as both a pipeline pig support and a seal or guide within a pipeline.

Referring to FIG. 1-3, collapsing structures 26 are provided between support members 24. Collapsing structures 26 connect between support members 24 in order to provide a continuous surface that is required to create the pressure differential across pipeline pig 10. Referring to FIG. 2, collapsing structures 26 are made from a membrane, or thinner walled-material, with a thickness that is less than the thickness of support members 24, which allows them to be the point at which resilient body 14 will collapse when folded, allowing the circumference of resilient body 14 to be reduced without risk of support members 24 buckling or overlapping. In addition, collapsing structures 26 are shaped such that they collapse in a predictable manner, to maintain a relatively continuous outer perimeter in both the expanded and reduced diameter modes. As shown, collapsing structures 26 are integrally formed with support members 24 at front face 34 and extend toward rear face 36. Collapsing structures 26 are generally V-shaped, although other shapes, such as a corrugated shape, etc., may also be used that result in collapsing structures 26 folding in the desired manner. Referring to the example shown in FIG. 8, collapsing structures 26 are made up of planar surfaces 38 that slope away from the outside edges 40 of collapsing structures 26 at front face 34 and meet at a central joint 42. Outside edges 40 and central spine 42 are designed as living hinges, such that they allow resilient body 14 to present a complete, unbroken surface. As can be seen, while planar surfaces 38 are straight between corresponding points on outside edges 40 and central joint 42, planar surfaces 38 have a slight twist or curve in the direction extending from rounded edge surface 32 toward central area 18. As can be seen, the angle of each planar surface 38 increases relative to the front face as each planar surface moves from outer perimeter 16 toward central area 18. The slight twist is due primarily to the geometry of collapsing structure 26, and in particular, the line of hinges 40 and 42, the taper of collapsing structure 26, and the angle of planar surfaces 38. The various parts of collapsing structures 26 are integrally formed and connected together using living hinges, which include fold lines of reduced thickness to facilitate bending.

As shown in FIGS. 2, 3 and 6, collapsing structures 26 are tapered to accommodate the folding of resilient body 14. In particular, collapsing structures 26 have a width (i.e. as measured between adjacent support members 24) and a depth (i.e. as measured along the thickness of resilient body 14) that increase as collapsing structures 26 move away from central area 18 toward outer perimeter 16 in order to accommodate more movement during folding and expansion. It has been found that the shape of collapsing structure 26, and their connection to support members 24, helps strengthen support members 24, allowing them to bear a greater load in the expanded diameter mode.

It will be understood that guides 100 may be used on different types of pipeline pigs. As will be discussed below, guides 100 were primarily designed to be used on a pipeline pig that includes an actuator that moves guides 100 to a folded, or reduced diameter mode, to simplify installation in a pipeline. However, guides 100 may also be useful on other types of pipeline pigs that do not include such an actuator, such as pigs that are designed to be installed by being pressed into a pipeline, where the pipeline itself acts to fold guides 100 to the reduced diameter mode and match the inner diameter of the pipeline, or a pipeline pig that moves from a larger diameter pipeline to a smaller diameter pipeline, such that the fluid pressure in the pipeline itself causes resilient body 14 to fold.

Referring now to FIG. 4-6, there is shown a pipeline pig 10 with an actuator 40 that is carried by pig body 12 to selectively release guides 100 from a reduced diameter mode to permit pig body 12 to expand to an expanded diameter mode. The expanded diameter mode is shown in FIG. 6, with support members 24 extending outward relative to pig body 12 and collapsing structures 26 expanded between support members 24. The reduced diameter mode is shown in FIGS. 4 and 5, with support members 24 folded toward pig body 12 and collapsing structures 26 collapsed to reduce the circumference of outer perimeter 16 of resilient body 14, allowing it to fit within a smaller diameter pipeline. As can be seen, in FIG. 4, actuator 40 retains resilient body 14 in the reduced diameter mode, while in FIG. 5, the actuator 40 has released resilient body 14, such that the pipeline itself retains resilient body 14 in the reduced diameter mode.

One example of a suitable actuator 40 is shown in FIG. 4-6. The depicted design has the benefit of relatively few moving parts, making it relatively simple to operate and maintain. It will be understood that other designs may also be used, such as designs that use multiple actuators, actuators that use different power sources (i.e. mechanical, hydraulic, electric, etc.), different ways of engaging resilient body, etc. In the depicted example, actuator 40 has a length adjustable member in the form of a hydraulic cylinder 42 that shifts a movable sleeve 44, which moves retainers 46 relative to resilient bodies 14. With guides 100 secured by connection 20 to pig body 12, retainers 46 selectively engages each guide 100, the length adjustable member moving the retainers along an axis of the pig body relative to resilient bodies 14 between a first position, shown in FIG. 4, in which the retainers retain the guides in the reduced diameter mode, and a second position, shown in FIG. 5, in which the guides are released and permitted to move to the expanded diameter mode, shown in FIG. 6. As shown, retainers 46 are carried by movable sleeve 44, which is nested and telescopically moves within an outer sleeve 48 to which guides 100 are attached, and hydraulic cylinder 42 telescopically moves sleeves 44 and 48 in order to expand and retract guides 100.

Figure 7:
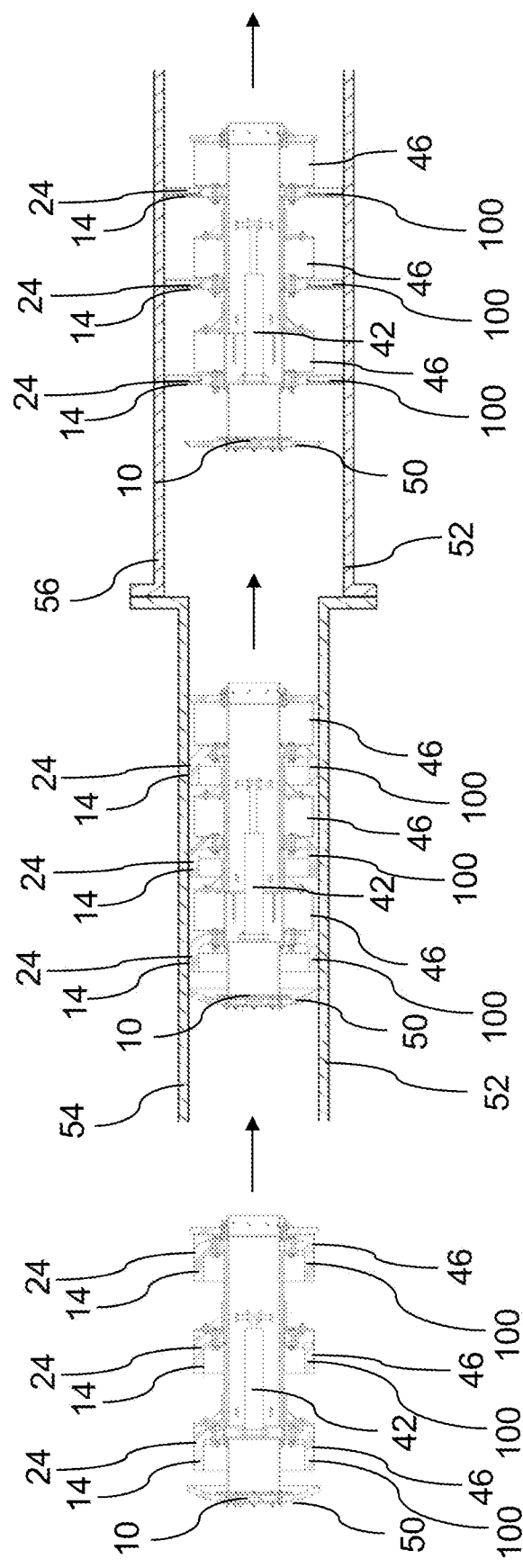
FIG. 7 is a side elevation view showing a pipeline pig passing through a small diameter section of a pipeline and a large diameter section of a pipeline.
Figure 8:
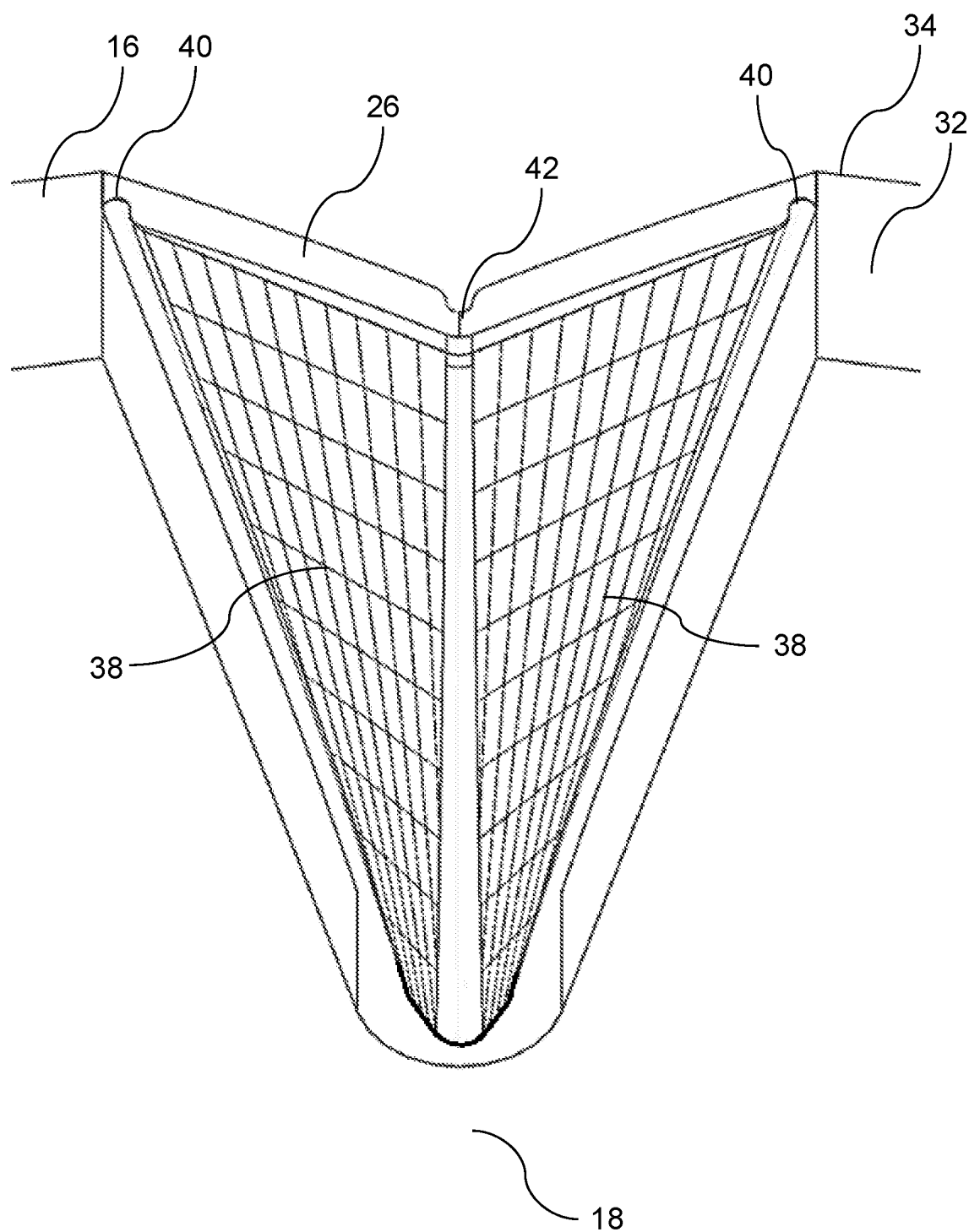
FIG. 8 is a detailed perspective view of the folding zone.

In one example, pipeline pig 10, which is shown as carrying a seal element 50, may be used as shown in FIG. 7, by first preparing pipeline pig by connecting hydraulic cylinder 42 to a power source and causing it to retract retainers 46 such that resilient body 14 folds over, until support members 24 are substantially parallel to an axis of pipeline pig 10 as shown in FIG. 4, or at least until the outer diameter of support members 24 is about equal to or less than the inner diameter of a pipeline 52. As resilient body 14 is flexible, this includes diameters that are slightly larger that can be overcome by application of a reasonable amount of force. Pipeline pig 10 is then inserted into a pipeline 52, and hydraulic cylinder 42 is actuated in the opposite direction to release support members 24, as shown in FIG. 5. While pipeline pig 10 is within the smaller diameter section 54 of pipeline 52, support members 24 will be retained in this position. As pipeline pig 10 enters a larger diameter section 56 of the pipeline 52, support members 24 will be allowed to return to the expanded diameter mode as shown in FIG. 6, such that pipeline pig 10 is supported within the pipeline 52 by support members 24. It will be understood that, depending on the diameter of the pipeline, support members 24 may not reach the fully expanded mode, but may still be limited to an intermediate position. However, it will be understood that guides 100 will be chosen such that the diameter in the expanded diameter mode will be equal to or greater than the largest diameter of the pipeline. In the depicted example, seal element 50 is used to help seal against the inner surface of the pipeline 52 when in the reduced diameter mode, but is small enough that it does not engage the pipeline 52 when in the expanded diameter mode.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. An expandable diameter pipeline pig for a varying diameter pipeline, the pipeline pig comprising:
   a pig body;
   two or more guides carried by the pig body, each of the guides comprising:
      a resilient body having an outer perimeter, a central area connected to the pig body, and a folding zone between the outer perimeter and the central area;
      a series of support members spaced circumferentially about the resilient body within the folding zone; and
      a series of collapsing structures positioned between, and integrally formed with, adjacent support members, the collapsing structures comprising membranes that have a thickness that is less than a thickness of the support members; and
   one or more actuators carried by the pig body that selectively release the guides from a reduced diameter mode to an expanded diameter mode, wherein, in the expanded diameter mode, the support members extend outward relative to the pig body and the collapsing structures are expanded between the support members, and in the reduced diameter mode, the support members are folded toward the pig body and the collapsing structures are collapsed to reduce a circumference of the outer perimeter of the resilient body, the support members being biased from the reduced diameter mode toward the expanded diameter mode.

2. The expandable diameter pipeline pig of claim 1, wherein the membranes slope away from a front face of the support members, the front face of the support members facing away from the pig body in the reduced diameter mode.

3. The expandable diameter pipeline pig of claim 2, wherein the membranes are integrally connected to the support members by living hinges.

4. The expandable diameter pipeline pig of claim 2, wherein the membranes have a width that extends between adjacent support members and a depth relative to the front face of the support members, and the width and the depth of the membranes increases as the membranes move away from the central area toward the outer perimeter.

5. The expandable diameter pipeline pig of claim 2, wherein the membranes comprise planar surfaces that angle away from the front face of the support members and meet at a central joint, the angle of each planar surface increasing relative to the front face as each planar surface moves from the outer perimeter toward the central area.

6. The expandable diameter pipeline pig of claim 1, wherein the resilient body is a disc-shaped body having a front face and a rear face, the rear face folding toward the pig body in the reduced diameter mode, wherein the collapsing structures are integrally formed with the support members at the front face of the disc-shaped body and extend toward the rear face.

7. The expandable diameter pipeline pig of claim 1, wherein the one or more actuators comprise a length adjustable member and a retainer that selectively engages each guide, the length adjustable member moving the retainers along an axis of the pig body between a first position in which the retainers retain the guides in the reduced diameter mode and a second position in which the guides are released to the expanded diameter mode.

8. The expandable diameter pipeline pig of claim 1, wherein, in the expanded diameter mode, the guides are sufficiently strong to independently centralize the pipeline pig in a pipeline.

9. An expandable guide for a pig body, comprising:
a resilient body having an outer perimeter, a central area having a connection for connecting to the pig body, and a folding zone between the outer perimeter and the central area;
a series of support members spaced circumferentially about the resilient body within the folding zone;
a series of collapsing structures positioned between, and integrally formed with, adjacent support members, the collapsing structures comprising membranes that have a thickness that is less than a thickness of the support members;
the resilient body being movable between an expanded diameter mode and a reduced diameter mode, wherein, in the expanded diameter mode, the support members extend outward relative to the pig body and the collapsing structures are expanded between the support members, and in the reduced diameter mode, the support members are folded toward the pig body and the collapsing structures are collapsed to reduce a circumference of the outer perimeter of the resilient body, the support members being biased from the reduced diameter mode toward the expanded diameter mode.

10. The expandable guide of claim 9, wherein the membranes slope away from a front face of the support members, the front face of the support members facing outward in the reduced diameter mode.

11. The expandable guide of claim 10, wherein the membranes are integrally connected to the support members by living hinges.

12. The expandable guide of claim 10, wherein the membranes have a width that extends between adjacent support members and a depth relative to the front face of the support members, wherein the width and the depth of the membranes increase as the membranes move away from the central area toward the outer perimeter.

13. The expandable guide of claim 10, wherein the membranes comprise planar surfaces that angle away from the front face of the support members and meet at a central joint, the angle of each planar surface increasing relative to the front face as each planar surface moves from the outer perimeter toward the central area.

14. The expandable guide of claim 9, wherein the resilient body is a disc-shaped body having a front face and a rear face, the rear face folding inward in the reduced diameter mode, wherein the collapsing structures are integrally formed with the support members at the front face of the disc-shaped body and extend toward the rear face.

15. A method of inserting a pipeline pig into a pipeline, at an insertion point, the pipeline having a first diameter at the insertion point and a second diameter downstream from the first diameter, the second diameter being greater than the first diameter, the method comprising the steps of:
providing a pipeline pig having a first guide and a second guide attached to a pig body, each of the first guide and the second guide comprising:
a resilient body having an outer perimeter, a central area connected to the pig body, and a folding zone between the outer perimeter and the central area; and
a series of support members spaced circumferentially about the resilient body within the folding zone; and
a series of collapsing structures positioned between, and integrally formed with, adjacent support members, the collapsing structures comprising membranes that have a thickness that is less than a thickness of the support members;
configuring the pipeline pig in a reduced diameter mode, wherein the support members are folded toward the pig body such that the collapsing structures collapse to reduce a circumference of the outer perimeter of the resilient body;
with the pipeline pig in a reduced diameter mode, inserting the pipeline pig into the pipeline at the insertion point;
releasing the support members from the reduced diameter mode such that the support members are biased toward an expanded diameter mode; and
creating a pressure differential across the pipeline pig to cause the pipeline pig to travel toward the second diameter of the pipeline.

16. The method of claim 15, wherein the membranes slope away from a front face of the support members, the front face of the support members facing away from the pig body in the reduced diameter mode.

17. The method of claim 16, wherein the membranes are integrally connected to the support members by living hinges.

18. The method of claim 16, wherein the membranes have a width that extends between adjacent support members and a depth relative to the front face of the support members, and the width and the depth of the membranes increases as the membranes move away from the central area toward the outer perimeter.

19. The method of claim 16, wherein the membranes comprise planar surfaces that angle away from the front face of the support members and meet at a central joint, the angle of each planar surface increasing relative to the front face as each planar surface moves from the outer perimeter toward the central area.

20. The method of claim 15, wherein the resilient body is a disc-shaped body having a front face and a rear face, the rear face folding toward the pig body in the reduced diameter mode, wherein the collapsing structures are integrally formed with the support members at the front face of the disc-shaped body and extend toward the rear face.

21. The method of claim 15, wherein configuring the pipeline pig in a reduced diameter mode comprises actuating a length adjustable member to move retainers that engage each guide and fold the support members toward the pig body.

22. The method of claim 21, wherein releasing the support members from the reduced diameter mode comprises causing the length adjustable member to move the retainers along an axis of the pig body between a first position in which the retainers retain the guides in the reduced diameter mode and a second position in which the guides are released to the expanded diameter mode.

23. The method of claim 15, wherein, in the expanded diameter mode, the guides are sufficiently strong to independently centralize the pipeline pig in a pipeline.

* * * * *